United States Patent [19]

Fabris et al.

[11] 3,725,357
[45] Apr. 3, 1973

[54] TEMPERATURE STABLE FLEXIBLE ISOCYANATE-TERMINATED POLYMERS AND POLYISOCYANURATE POLYMERS THEREFROM

[75] Inventors: Hubert Jakob Fabris, Akron; Edwin Morgan Maxey, Kent; Arden Everett Schmucker, Alliance, all of Ohio

[73] Assignee: The General Tire & Rubber Company, Akron, Ohio

[22] Filed: Dec. 29, 1971

[21] Appl. No.: 213,826

[52] U.S. Cl..260/77.5 NC, 260/2.5 AW, 260/75 NE, 260/75 AT, 260/77.5 AA, 260/77.5 AT, 260/77.5 R, 260/78 SC
[51] Int. Cl............................C08g 22/20, C08g 20/00
[58] Field of Search...260/75 AT, 77.5 AT, 77.5 NC, 260/77.5 AA, 75 NE, 2.5 AW, 75 T, 78 SC

[56] References Cited

UNITED STATES PATENTS

| | | | |
|---|---|---|---|
| 2,340,757 | 2/1944 | Kaase et al. | 260/453 |
| 2,865,940 | 12/1958 | Nobis et al. | 260/453 |
| 3,595,900 | 7/1971 | Loudas et al. | 260/453 |

Primary Examiner—Donald E. Czaja
Assistant Examiner—H. S. Cockeram
Attorney—McCoy, Greene & Howell

[57] ABSTRACT

A urethane-free trimerizable polymer for use in building isocyanurate structures that provide flexiblity, decreased friability and improved temperature stability therein is made by converting a nitro group on an aromatic nucleus that is terminal to a linear or substantially linear polymer of average molecular weight 600 to 3,000 to the corresponding isocyanate group for later incorporation into an isocyanurate structure.

7 Claims, No Drawings

TEMPERATURE STABLE FLEXIBLE ISOCYANATE-TERMINATED POLYMERS AND POLYISOCYANURATE POLYMERS THEREFROM

BACKGROUND OF THE INVENTION

Isocyanurates are widely used in applications where low weight and high strength are required in combination with thermal stability. One such use is in automobile roof interlinings wherein the isocyanurates provide significantly improved sound absorption in combination with sufficient mechanical strength and high temperature stability for the conditions normally encountered within the interior of an automobile just beneath the roof.

Isocyanurates, however, are quite rigid and friable and these detracting qualities must be nullified or significantly improved to render them commercially acceptable. Normally, isocyanate prepolymers are added to provide both increased flexibility and decreased friability in the cured matrix. The long chains in the prepolymer provide flexibility as well as integrity to the overall matrix. Isocyanate prepolymers that are prepared from a reaction between a polyol and an excess of a polyisocyanate give the requisite isocyanate prepolymer. However, the polymer contains a substantial quantity of urethane groups, stemming from the reaction of the hydroxyl group with the isocyanate group. These groups are inherently unstable at high temperature and degrade or decrease the overall temperature stability of the isocyanurate matrix.

The principal object of this invention is to provide a urethane-free trimerizable polymer or prepolymer that can be used to build isocyanurate structures to provide the requisite flexibility and decrease in friability but without significantly lowering the temperature stability of the isocyanurate structure. Another object is to provide a method of preparing the desired trimerizable prepolymer. These and other objects which are obvious from the following description are satisfied by this invention.

SUMMARY OF THE INVENTION

This invention concerns temperature stable, flexible isocyanate-based trimerizable polymers or prepolymers that are free of residual urethane groups and a method of making said polymers comprising reacting a hydroxy-terminated polymer with a nitro-substituted benzoyl halide to form the corresponding benzoylated product, hydrogenating the benzoylated product to convert each nitro group to a primary amine group and reacting that product with phosgene to convert each primary amine group to an isocyanate group. Prior to trimerizing the prepolymer, the prepolymer has the following general structure:

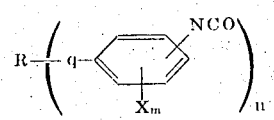

where each $q$ is an ester, amide or ketone group; each X is any substituent non-reactive to the isocyanate group, such as an alkyl group, a halogen atom, a carboxylic ester group, a sulphonic ester group, an acyloyl group or an alkoxyl group; $m$ is any integer from 0–4; $n$ is any integer from 2–6; and R is a polyester, polyester-amide, polyamide, polycarbonate, polyether, polythioether or polyhydrocarbon of average molecular weight 600 to 3,000. For ease in handling the prepolymer should be a liquid at temperatures no higher than about 100° C., preferably at 80° C. or lower.

DESCRIPTION OF THE PREFERRED EMBODIMENT

The method of producing the trimerizable urethane-free polymers of this invention consists essentially of (1) reacting (A) a mononuclear nitro-substituted aromatic compound containing a functional substituent reactable with a labile hydrogen with (B) a linear or substantially linear polymer of average molecular weight 600 to 3,000 having two to six labile hydrogen atoms, preferably as amine or hydroxyl groups, and (2) converting the nitro groups to isocyanate groups. The preferred component (A) is p-nitrobenzoyl chloride.

Examples of polymers suitable for use as component (B) include hydroxy-terminated polyesters, hydroxy- or amine-terminated polyester amides, hydroxy- or amine-terminated polyamides, hydroxy-terminated polycarbonates, hydroxy-terminated polyethers, hydroxy-terminated polythioethers and hydroxy-terminated polyhydrocarbons, all of average molecular weight 600 to 3,000.

Examples of hydroxy-terminated polyethers include polyether diols that are made by reacting an alkylene oxide such as propylene oxide with a strong base such as potassium hydroxide.

Hydroxy-terminated polyhydrocarbons of average molecular weight 600 to 3,000 can be made by essentially complete hydrogenation of a functionally reactive, unsaturated, substantially linear, hydrocarbon backbone polymer. The unsaturated polymeric starting material can be any unsaturated, functionally reactive polymer having a functionality from about 1.5 to 4, preferably about 2 per polymer molecule. Examples of useful starting materials are polymers of butadiene and other conjugated dienes of four to six carbon atoms such as isoprene and/or dimethyl butadiene. Copolymers and terpolymers of conjugated dienes such as butadiene and isoprene with acrylonitrile and/or methacrylonitrile can be used. Other monomers such as styrene can also be incorporated in the polymer during polymerization.

A nitro-substituted benzoyl halide (A) such as p-nitrobenzoyl chloride is reacted with (B) a primary hydroxyl- or amine-terminated polyhydrocarbon such as hydrogenated polybutadiene in the presence of an amine catalyst to form an ester according to the following general structure:

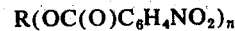

$$R(OC(O)C_6H_4NO_2)_n$$

wherein R represents the polyhydrocarbon. Such a reaction is carried out in the absence of water and can be conducted at room or elevated temperature over a period of 2 to 4 hours. The benzoyl halide can also contain other substituents on the ring that are nonreactive to the ultimately prepared isocyanate group that comes from conversion of the nitro group.

Examples of amine catalysts which can be used to enhance the rate of benzoylation include triethylenediamine, tetramethylbutanediamine, triethylamine, N-methylmorpholine, n-cocomorpholine, 1-dimethylaminoethylpiperazine, 3-methoxy-n-dimethylpropylamine, N,N-diethyl-3-diethylaminopropylamine, dimethylbenzylamine and pyridine.

The nitro groups are then converted to isocyanate groups by any of the known methods. One method consists of hydrogenation of the nitro groups by reaction with hydrogen in contact with a catalyst such as Raney nickel, platinum or palladium at super atmospheric pressure and high temperature to convert the nitro groups to primary amine groups and the subsequent reaction of the resulting primary amine groups with phosgene to form isocyanate groups without the formation of urethane groups or other change in the structure of the initial polymer molecule. The resulting polymer is further polymerizable through reaction of the urethane-free isocyanate groups to a higher polymer through trimerization into an isocyanurate structure. Trimerization of the isocyanate-containing polymer is accomplished by reaction with one or more of the many trimerization catalysts already known in the art, such as N, N', N''-tri-(dimethylaminopropyl)-sym-hexahydro-triazine.

Prior to trimerization, the urethane-free isocyanate-containing polymers have the following general structure:

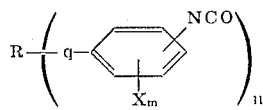

in which each $q$ is a carboxy, amido, or keto linkage group; each X is a substituent non-reactive to an isocyanate group such as, for example, an alkyl group, a halogen atom, a carboxylic ester group, a sulphonic ester group, an acyloyl group or an alkoxyl group; each $m$ is any integer from 0 to 4; $n$ is any integer from 2 to 6; and R is a polyester, polyesteramide, polyamide, polycarbonate, polyether, polythioether or polyhydrocarbon of average molecular weight 600 to 3,000.

Other methods of substituting a nitro group onto an aromatic nucleus that is terminal to a linear or substantially linear polymer includes incorporation by polyesterification or in the presence of nitrobenzoic acid as a molecular weight regulator. Further, these polymerizable, urethane-free, isocyanate-containing polymers are available for blending with other isocyanate-containing polymers of lower or higher molecular weight such as 4,4'-diisocyanatodiphenylmethane and toluene diisocyanate for later trimerization or for utilization in various foam formulations.

The following example is given to illustrate the best presently known mode for practicing the invention and to show the improvement in temperature stability of a film formed from the polymers of this invention in comparison with films made from conventional isocyanurate structures.

EXAMPLE

A solution was made of 744 grams (0.0685 mol) of hydrogenated, primary hydroxyl-terminated polybutadiene of average molecular weight 2,150 and 25.4 grams (0.137 mol) of p-nitro-benzoyl chloride in 6,000 ml. dry toluene. 20.8 ml. (0.204 mol) of triethyl amine catalyst was added slowly to the stirred solution over a period of one-half hour at a temperature of 25°–30° C. Stirring was thereafter continued for 3 hours after which time the reaction mixture was washed with water. The product, after removal of volatiles, had a residual hydroxyl number of 0.018 meq/gram and an acid number of 0.5 KOH/gram.

The nitro groups in the product were thereafter hydrogenated at 1,000 psi hydrogen pressure at 125° C. for 8 hours over a palladium on charcoal catalyst to convert them to primary amine groups. The resulting product had an amine content of 0.75 meq/gram.

One-hundred forty grams of the amine-terminated polymer prepared above were dissolved in 200 ml. of chlorobenzene. This solution was slowly added at 0°–5° C. to a solution of 30 grams of phosgene in 100 ml. of chlorobenzene equivalent to 3 mols of phosgene per amine group. After completed addition, the reaction mixture was refluxed under a dry ice condenser for 1 hour. The excess phosgene was evaporated off with nitrogen, and the resulting polymer had an isocyanate content of 0.693 meq/gram (theoretical 0.631 meq/gram).

A small amount of the above-prepared chlorobenzene solution of urethane-free isocyanate-containing polymer was catalyzed with a few drops of N,N',N''tris-(dimethylaminopropyl)-sym-hexahydrotriazine and cast into a film on a glass plate in an atmosphere of dry nitrogen at 80° C. The film trimerized into an isocyanurate structure.

A conventional isocyanurate structure was prepared by reacting 18 grams of 4,4'-diisocyanateodiphenylmethane with 100 grams of the same hydrogenated, primary hydroxyl-terminated polybutadiene of average molecular weight of 2,150 (mol ratio OH/NCO=1/2) using five drops of dibutyl tin dilaurate catalyst in 300 ml. of chlorobenzene at 75° C. for 2 hours. The isocyanate content of the resultant polymer was 0.581 meq/gram. A film was also prepared from this material using N,N',N''-tris-(dimethylaminopropyl)-sym-hexahydrotriazine in an atmosphere of dry nitrogen at 80° C.

The film prepared from the urethane-free isocyanate-containing polymer of this invention retained 58 percent of its original tensile strength and 62 percent of its original elongation after exposure to 220° C. for 1 hour while the film made by trimerization of the commercial prepolymer retained only 21 percent and 29 percent respectively of these properties under the same conditions. A conventional thermogravimetric analysis was performed upon both films. The thermograms in air showed only a 19 percent weight loss at 400° C. for the film prepared from the urethane-free polymer of the invention whereas the conventionally trimerized material showed a weight loss of 42 percent at the same temperature.

We claim:

1. A method of making isocyanate-terminated trimerizable polymers that are free of residual urethane groups consisting essentially of (1) reacting (A) a mononuclear nitrotsubstituted aromatic compound containing a functional substituent reactable with a labile hydrogen with (B) a substantially linear urethane-free polymer having an average molecular weight from about 600 to 3,000 having two to six labile hydrogen atoms per polymer and (2) converting the nitro groups to isocyanate groups.

2. The method of claim 1 wherein said linear or substantially linear polymer of average molecular weight 600 to 3,000 is selected from the group consisting of polyesters, polyesteramides, polyamides, polycarbonates, polyethers, polythioethers and polyhydrocarbons.

3. The method of claim 2 wherein component (A) is a nitro-substituted benzoyl halide.

4. The method of claim 1 wherein said step (2) of converting the nitro groups to isocyanate groups comprises hydrogenating said nitro groups to primary amine groups and then reacting said amine groups with phosgene to form said isocyanate groups.

5. A method of making a temperature stable, flexible, isocyanurate polymeric structure that is free of urethane groups comprising:
   1. reacting a hydroxy-terminated urethane-free polymer having an average molecular weight from about 600 to 3,000 with a nitro-substituted benzoyl halide to form the corresponding benzoylated product;
   2. hydrogenating said benzoylated product to convert said nitro groups to primary amine groups;
   3. reacting the product from step (2) with phosgene to convert the primary amine groups to isocyanate groups; and,
   4. trimerizing the resulting urethane-free isocyanate-terminated polymer into an isocyanurate polymer.

6. The method of claim 5 wherein said hydroxy-terminated polymer is selected from the group consisting of polyester, polyesteramide, polyamide, polycarbonate, polyether, polythioether and polyhydrocarbon, all having an average molecular weight of from about 600 to 3,000.

7. A urethane-free polymer of the general formula

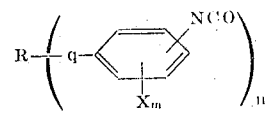

in which each $q$ is an ester, amide or keto linkage group, each $x$ is a substituent non-reactive to isocyanate, $m$ is number in the range of 0 to 4, $n$ is a number in the range of 2 to 6 and R is a polymer having a valence of $n$ and selected from the group consisting of polyester, polyesteramide, polyamide, polycarbonate, polyether, polythioether and polyhydrocarbon, said polymer having an average molecular weight of from about 600 to 3,000.

* * * * *